United States Patent [19]
Hojyo

[11] 3,866,277
[45] Feb. 18, 1975

[54] METHOD OF SHRINKING CLOTH OR PAPER

[76] Inventor: Iwajiro Hojyo, 30-13 Katsurahitsujisaru-cho, Kyoto, Japan

[22] Filed: Apr. 30, 1973

[21] Appl. No.: 355,935

[30] Foreign Application Priority Data
Dec. 13, 1972 Japan .............................. 47-125067

[52] U.S. Cl. .................. 26/18.6, 162/111, 162/206
[51] Int. Cl. ............................................ D06c 21/00
[58] Field of Search ............ 26/18.6; 162/111, 113, 162/206, 280, 361

[56] References Cited
UNITED STATES PATENTS
3,447,453   6/1969   Rojecki ............................ 26/18.6 X FOREIGN PATENTS OR APPLICATIONS
129,015   9/1948   Australia .............................. 162/280
951,703   3/1964   Great Britain ...................... 162/361
7,003,524   10/1970   Netherlands ......................... 26/18.6

Primary Examiner—Robert R. Mackey

[57] ABSTRACT

A method of shrinking cloth or paper which comprises the steps of gently clamping an elastic endless belt between two rollers forming two spaced nip points on a common driven roller; stretching one portion of said elastic endless belt defined between said two clamping points; feeding a work material to one clamping point along the stretched and thinned portion of the endless belt; further conducting the work material along the remaining nonstretched portion of the endless belt, thereby shrinking the work material to the prescribed extent due to said remaining portion suddenly contracting itself by having the thickness increased upon release from the stretching force.

3 Claims, 3 Drawing Figures

METHOD OF SHRINKING CLOTH OR PAPER

This invention relates to a method of quickly shrinking a band-shaped work material: printing paper like newspaper, kraft paper, knitted goods and woven fabric.

The object of applying such a shrinking treatment to the above-mentioned band-shaped work material such as woven fabric and paper is to enable the work material to have a denser structure, namely, in the case of printing paper, to save printing ink, prevent impressions from appearing on the backside and increase the toughness of the paper and, in the case of woven fabric and knitted goods, to elevate the softness as well as the toughness of the texture itself.

A work material such as cloth or paper has generally been subjected to a shrinking treatment by one of the following two processes. A first process comprises the steps of pressing a rotatable heating roller against the surface of an endless rubber belt; conducting a work material while being inserted therebetween; bending the rubber belt in a semicircular form around the outer periphery of the heating roller; under this condition, rotating both heating roller and rubber belt in the same direction, thereby shrinking the work material. When bent in a semicircular form, the rubber belt has its inner surface contracted, causing a work material tightly abutting against said contracted inner surface of the rubber belt to shrink in proportion to the degree of said contraction.

A second process consists in forcefully pressing a heating roller made of relatively hard material against a relatively soft rubber roller; conducting a work material while being inserted therebetween; and rotating both rollers in the same direction, thereby shrinking the work material. The shrinkage of the work material is effected by the fact that the part of the soft rubber roller pressed against the hard heating roller is depressed thereby, and both rollers present different peripheral speeds in the section where said depression takes place, thereby causing the work material to shrink when passing the depressed surface of the soft rubber roller. The two above-mentioned prior processes are already set forth in the U.S. Pat. No. 2,021,975 patented on Nov. 26, 1935 and the U.S. Pat. No. 2,146,694 patented on Feb. 7, 1939. However, these processes are accompanied with various disadvantages. In the case of the first process, the rubber belt must have a sufficient thickness to cause its inner surface to be contracted when it is bent in a semicircular form. The more desired the contraction of said inner surface, the more necessarily increased the thickness of the rubber belt. Such a thick rubber belt is unsatisfactory in respect of durability, because its surface is likely to give rise to cracks, wear spots or the like. Further, the thick rubber belt requires a fully rigid supporting system including guide rollers due to its considerable weight, rendering the system very bulky and expensive.

In the case of the second process, the hard heating roller must apply a considerably pressure in order to depress the surface of the soft rubber roller when abutting against it. Though varying with the material of the rubber roller, the quality of a work material being treated and the feed rate, the pressure should generally be of the order of 30 to 300 kg/cm$^2$. The reason is that unless a fully high pressure is exerted, the soft rubber roller will only indicate a slight depression on the surface. Accordingly, required application of such high pressure will damage a work material conducted between both rollers. For example, knitted goods will undesirably have the texture crushed and its visual appeal noticeably deteriorated. Further where a work material consists of paper, it will possibly be broken when it shrinks under such high pressure, and what is worse the rubber roller itself has low durability. Accordingly, the second process is considered quite unacceptable.

As described above, any of the conventional processes could not fully shrink a band-shaped work material such as cloth or paper. Such prior apparatus used raised problems with the durability of parts as well as with the treating capacity which only enabled a work material to be treated at as slow a rate as about 7 meters per minute at most.

The invention utilizes an elastically extensible rubber belt having its thickness reduced when stretched driven by at least one driving roller. The endless belt is clamped with a relatively low pressure at two points, namely, at a tangential point between an upper roller and the driving roller and between a lower roller and said driving roller. One portion of the endless belt defined between said two tangential points is stretched by a tension control roller so as to have the thickness more reduced than that of the remaining portion of the endless belt. Under this condition, the driving roller and, in consequence, the upper and lower rollers are rotated to drive the endless belt. A band-shaped work material is made to travel up to the tangential or clamping point between the upper roller and driving roller, first together with the stretched and thinned portion of the endless belt, and then with the remaining nonstretched and thickened portion of the endless belt. During transit from the stretched to the nonstretched portion of the endless belt, the work material is subjected to a shrinking treatment.

A first object of this invention is to provide a method of fully shrinking a band-shaped work material such as cloth or paper.

A second object of the invention is to provide a method of quickly shrinking a band-shaped work material such as cloth or paper by a very simple, easy treatment and operation.

A third object of the invention is to provide a shrinking method particularly adapted for knitted goods or printing paper which is capable of effecting a shrinking treatment without applying an undue pressure to a work material.

A fourth object of the invention is to provide a shrinking method which enables the parts of a constituent device, for example, a driving roller to have an elevated durability.

Further objects of the invention will be readily understood by reference to the description of the embodiments set forth in the specification and the accompanying drawings.

Figure 1:
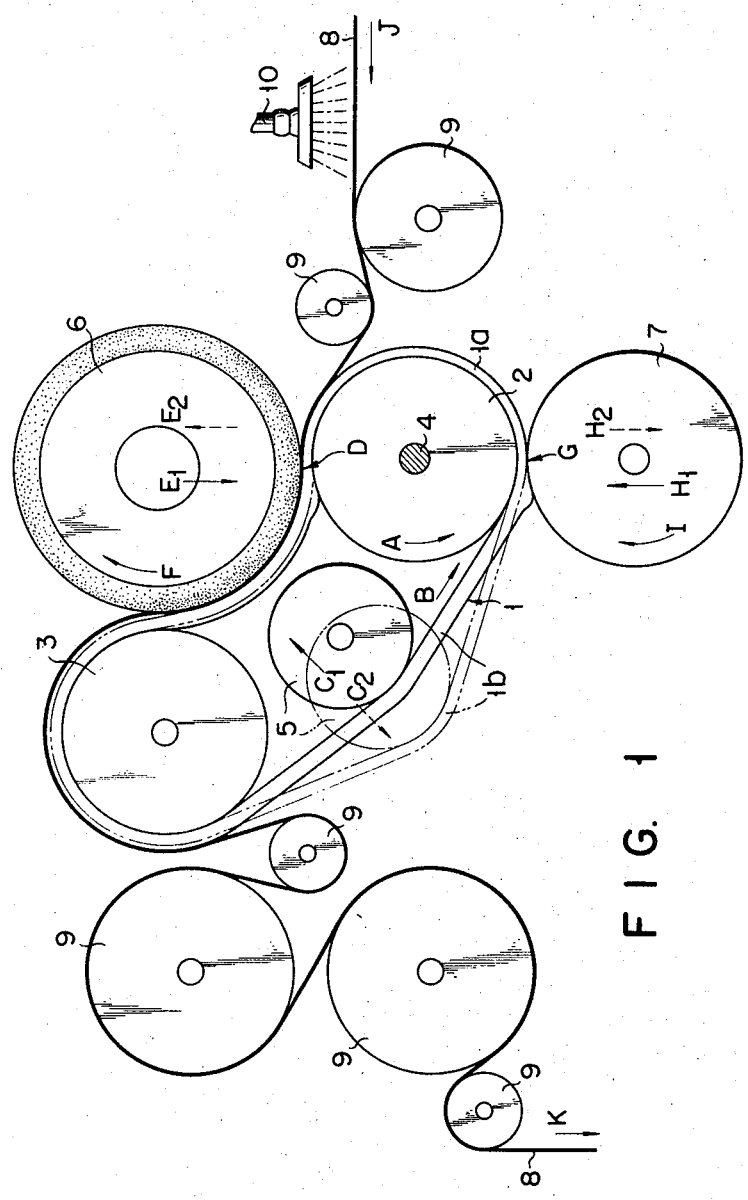
FIG. 1 is a schematic side view of a shrinking machine according to an embodiment of this invention.

There will now be described by reference to FIG. 1 a shrinking machine according to a first embodiment of this invention. Reference numeral 1 denotes an endless belt, which should preferably be made of soft, elastic, heat resistant synthetic or natural rubber with a thickness of about 6 mm to 50 mm. While not particularly fixed, the width and peripheral length of the endless rubber belt are properly chosen to the kind of work material treated and the rate of shrinking treatment. The endless rubber belt 1 is elastically extensible and, when stretched, has its thickness reduced. The endless rubber belt 1 is set across the driving roller 2 and rotatable support 3. The driving roller 2 is connected to a source of driving power, for example, a motor (not shown) by a support shaft 4 so as to rotate continuously in the direction of the arrow A. Rotation of the driving roller 2 makes the endless rubber belt 1 travel in the direction of the arrow B. Within an area enclosed by the endless rubber belt 1 is disposed a tension control roller 5 which not only guides the endless rubber belt 1 but also adjusts its travelling condition by moving slantwise of the shrinking machine as viewed in the cross section, namely in the direction of the solid line arrow $C_1$ or in the opposite direction of the broken line arrow $C_2$. Said tension control roller 5 normally takes a solid line position. When the tension control roller 5 is shifted to a broken line position, it extends the endless rubber belt 1 to a state indicated by broken lines, thereby decreasing the thickness of that portion of said belt 1 which is defined between the aforesaid two tangential or clamping points D and G.

As seen from FIG. 1, the upper roller 6 is located outside of the endless rubber belt 1 and clamps it at the tangential point D in cooperation with the driving roller 2. Said upper roller 6 is made of stainless steel and concurrently acts as a heating roller. It will be noted that in the following description the upper roller 6 is referred to as a heating roller. This heating roller 6 can move vertically, namely, in the direction of the arrow $E_1$ and the opposite direction of the arrow $E_2$. When the driving roller 2 rotates in the direction of the arrow A, the heating roller 6 rotates in the direction of the arrow F while clamping the endless rubber belt 1 at the tangential point D in cooperation with the driving roller 2, thereby conducting the belt 1 to the left side of said tangential point D along the outer periphery of the heating roller 6 toward the support roller 3.

The lower roller 7 is disposed similarly outside of the endless rubber belt 1 at a point facing the heating roller 6 right across the driving roller 2 so as to clamp the endless rubber belt 1 at the other tangential point G in cooperation with the driving roller 2. The lower roller 7 can be shifted vertically, namely, in the direction of the solid line arrow $H_1$ and in the opposite direction of the broken line arrow $H_2$. When the driving roller 2 rotates in the direction of the arrow A, the lower roller 7 rotates in the direction of the arrow I, while clamping the endless rubber belt 1 at the tangential point G in cooperation with the driving roller 2, thereby conducting the endless rubber belt 1 to the right side of the tangential point G along the outer periphery of the driving roller 2 toward the first-mentioned tangential point D.

A band-shaped work material 8 is brought from the right side of FIG. 1 in the direction of the arrow J up to the tangential point D between the driving roller 2 and heating roller 6 with the travel of the endless rubber belt 1, thereafter is carried to the left side of FIG. 1 through the support roller 3, and finally delivered outside of the shrinking machine in the direction of the arrow K. Ahead and behind the tangential or clamping point D are provided a number of guide rollers which are collectively denoted by the same numeral 9 for convenience of description. Ahead of the tangential or clamping point D is disposed a water spray 10, which supplies a work material 8 with a proper amount of water as pretreatment before the full-scale shrinking operation is carried out.

A work material 8 may consist of woven goods, knitted goods, printing paper, for example, newspaper, kraft paper or any other kind which it is desired to subject to a shrinking treatment.

There will now be described the operation of shrinking a work material 8 such as cloth or paper by the shrinking machine of this invention. First, the heating roller 6 and lower roller 7 are kept removed from the driving roller 2 in the directions of the broken line arrows $E_2$ and $H_2$, respectively. Under this condition, the tension control roller 5 is slantwise shifted in the direction of the broken line arrow $C_2$ from the solid line position to the broken line position, thereby extending the endless rubber belt 1 to a state indicated by the broken lines. Thereafter, the heating roller 6 and lower roller 7 are shifted in the directions of arrows $E_1$ and $H_1$, respectively, so as to gently abut against the driving roller 2 with the endless rubber belt 1 interposed therebetween. Said abutment may be effected with such a gentle pressure as is required to prevent the endless rubber belt 1 from slipping off the peripheral surfaces of the rollers 6, 7 and 2 when the tension control roller 5 is brought back to its normal position by moving in the direction of the solid line arrow $C_1$. Said abutting pressure may generally be of the order of 3 to 30 kg/cm$^2$. Practically, a suitable level of pressure is chosen from this range, depending, for example, on the thickness and hardness of the endless rubber belt 1, and the feed rate and quality of the work material treated. When the tension control roller 5 is moved back to its normal position, the left side nonstretched portion 1b of the endless rubber belt 1 with the tangential points D and G taken as boundaries contracts itself due to its thickness being increased by release from the stretching force applied to the right side portion 1a of the belt 1, whereas said right side portion 1a gently pressed against the periphery of the driving roller 2 still remains stretched. While the driving roller 2 rotates in the direction of the arrow A, the heating roller 6 and lower roller 7 apply a fixed pressure to the endless rubber belt 1 at the tangential points D and G so as to conduct the right side portion 1a of the belt 1 defined between said tangential points D and G under a strethced and thinned condition. To this end, it has been experimentally found that both heating and lower rollers 6 and 7 should apply an equal pressure. Accordingly, it is desired that both rollers 6 and 7 be shifted simultaneously by a common driving mechanism (not shown). When both rollers 6 and 7 apply an equal pressure, the endless rubber belt 1 can travel at a far higher speed than possible with the prior art. Namely, this invention enables the endless rubber belt 1 to run at the rate of 70 to 200 meters per minute. In this case, the left side portion 1b of the endless rubber belt 1 should preferably be prevented from sagging.

A work material 8 such as cloth or paper is fed to the shrinking machine in the direction of the arrow J from the right side of FIG. 1 and guided by the guide rollers 9 to the tangential point D together with the endless belt 1. Before introduced into the shrinking machine, the work material 8 has its surface moistened with water by spray 10. The work material 8 travels first together with the stretched and thinned right side portion 1a of the endless rubber belt 1 until it reaches the tangential point D, and then together with the left side portion 1b of the belt 1 while being pressed against the surface of the endless rubber belt 1 by the heating roller 6 at said tangential point D. At this tangential point D the endless rubber belt 1 has its right side portion 1a changed into its left side portion 1b, causing the outer surface of said left side portion 1b suddenly to contract in the travelling direction due to the thickness being increased by release from the stretching force applied to the right side portion 1a. as the result, the work material 8 tightly attached to the surface of the endless rubber belt 1 is similarly subjected to shrinking. The shrunk work material 8 is kept intact by the pressure and heating applied by the heating roller 6, and travels along the periphery of the heating roller 6 together with the endless rubber belt 1. During this time the heating roller 6 continues to heat the work material 8 permanently to set its shrunk form. After leaving the heating roller 6, the work material 8 passes around the support roller 3 together with the endless rubber belt 1, and thereafter is guided by four guide rollers 9 in succession in the direction of the indicated arrow K to be delivered outside of the shrinking machine. The work material 8 whose shrinking treatment has been completed is further subjected to an aftertreatment by a separate device (not shown) to be made up into a product.

The degree to which the work material 8 is made to shrink agrees with that to which the left side nonstretched portion 1b of the endless rubber belt 1 contracts itself. The shrinkage of the work material 8 is determinated by the ratio which the contraction of the left side portion 1b of the endless rubber belt 1 bears to the extension of the right side portion 1a thereof. The more stretched the right side portion 1a, the more prominently shrunk the work material 8. However, a desired shrinking effect can be fully attained even without stretching said right side portion 1a to any excessive extent. Immediately after leaving the tangential point D, the endless rubber belt 1 has its left side portion 1b more thickened, as illustrated in FIG. 1, than its right side portion 1a. This event generally appears during the travel of the endless rubber belt 1, thereby more effectively assisting the left side portion 1b of the endless belt 1 to contract itself immediately after leaving the tangential point D.

There will now be described by reference to FIG. 2 a shrinking machine according to another embodiment of this invention. The same parts of FIG. 2 as those of FIG. 1 are denoted by the same numerals or notations as FIG. 1 or those related thereto.

The endless rubber belt 1 is guided by the support roller 3 disposed at the left side end of the endless rubber belt 1 and the tension control roller 5 positioned at the right side end thereof. The driving roller 2 is located substantially at the center of the endless rubber belt 1 and connected to a source of driving power (not shown) by the driving shaft 4 so as to rotate in the direction of the arrow A. The upper and lower rollers 6 and 7 are set outside of the endless rubber belt 1 so as to face each other right across the driving roller 2, thereby pressing the endless rubber belt 1 to the periphery of the driving roller 2. The upper and lower rollers 6 and 7 are rotatably supported by support arms 11 and 12, respectively. Upon rotation of the driving roller 2 in the direction of the arrow A, the upper and lower rollers 6 and 7 rotate in the directions of the arrows F and I, respectively so as to conduct the endless rubber belt 1 in the direction of the arrow B. Both arms 11 and 12 are made to move vertically at the same time in the directions of the arrows E and H by an oil pressure driving mechanism (not shown). Therefore the portions of endless rubber belt 1 are pressed against the periphery of the driving roller 2 with an equal pressure. The pressure applied to the endless rubber belt 1 should preferably be of such magnitude that where the right side portion 1a of the endless rubber belt 1 is stretched by the shifting of the tension control roller 5 in the direction of the arrow $C_1$ from the broken line position to the solid line position, the endless rubber belt 1 is prevented from slipping at the tangential points D and G. Where the tension control roller 5 takes the broken line position by being shifted in the direction of the arrow $C_2$, then the endless rubber belt 1 is not subjected to any stretching force, so that the right and left side portions 1a and 1b do not present any different thicknesses. Where the control roller 5 occupies the solid line position by moving in the direction of the arrow $C_1$, then the right side portion 1a of the endless rubber belt 1 is stretched to have a smaller thickness than the left side portion 1b. The condition in which said right side portion 1a is stretched by the tension control roller 5 remains unchanged even while the driving roller 2 rotates.

A pair of heating and calendering rollers 13 and 14 disposed on both sides of the upper roller 6 gently abut against the surfaces of the right and left portions 1a and 1b, respectively of the endless rubber belt 1. Where the endless rubber belt 1 travels in the direction of the arrow B, both heating and calendering rollers 13 and 14 rotate in the directions of the arrows L and M, respectively. Right below said rollers 13 and 14 are disposed keep plates 15 and 16. These keep plates 15 and 16 prevent the endless rubber belt 1 from being excessively flexed when both rollers 15 and 16 are pressed against the belt 1, and also from being unduly shaken during its travel.

Figure 2:
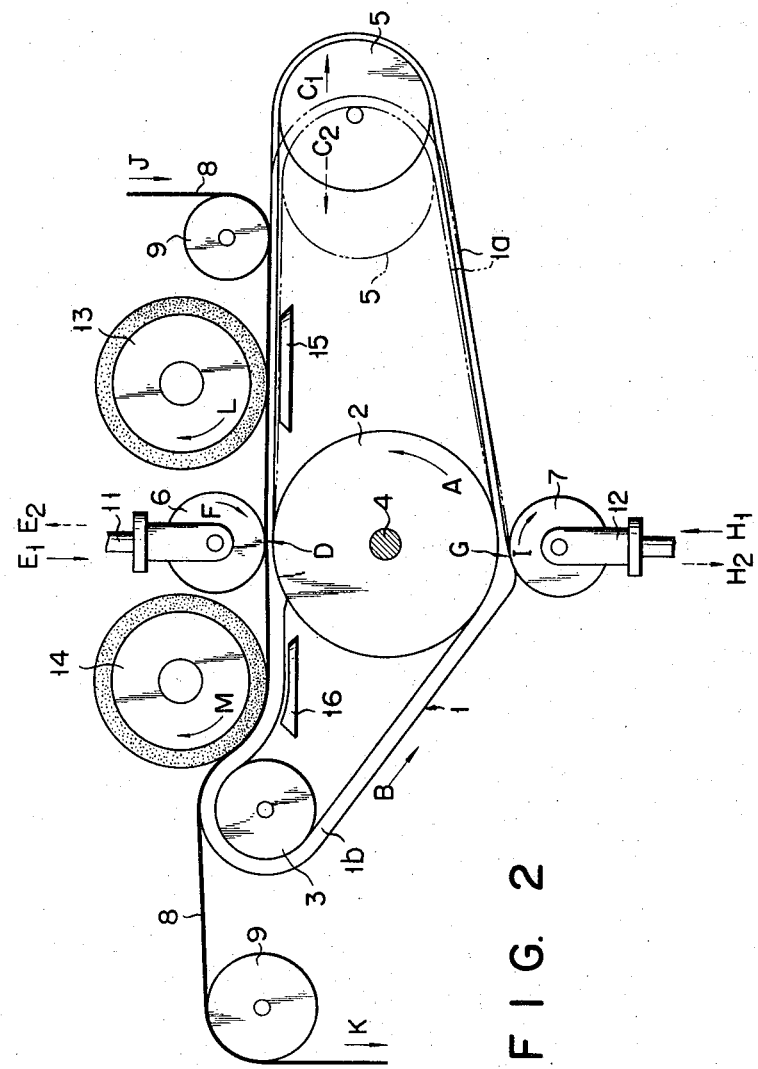
FIG. 2 is a schematic side view of a shrinking machine according to another embodiment of the invention.

A band-shaped work material such as cloth or paper is brought to the shrinking machine from the right side of FIG. 2, guided by the forward guide roller 9 in the direction of the arrow J, placed on the surface of the right side portion 1a of the endless rubber belt, conducted to the tangential point D together with said right side portion 1a and thereafter carried beyond the tangential point D together with the left side portion 1b of the endless rubber belt 1. Immediately after passing the tangential point D, the endless rubber belt 1 has its left side portion 1b suddenly contracted in the direction of its travel due to its thickness being increased by release from the stretching force applied to its right side portion 1a. Accordingly, the work material 8 now travelling together with the nonstretched left side portion 1b is made to shrink to the same degree as that to which said left side portion 1b contracts itself. With the shrunk form permanently set by the pressure and heating applied by the rear heating and calendering roller 14, the work material 8 is separated from the endless rubber belt 1 and guided around the rear guide roller 9 in the direction of the arrow K to be delivered outside of the shrinking machine.

In the embodiment of FIG. 2, the work material 8 is subjected to shrinking treatment in the same manner as in the embodiment of FIG. 1 immediately after leaving the tangential point D. The embodiment of FIG. 2 differs from that of FIG. 1 in that right side portion 1a of the endless rubber belt 1 does not slidably abut against the periphery of the driving roller 2 but is stretched directly by the tension control roller 5. Immediately after the right side portion 1a of the endless rubber belt 1 passes the tangential point D, the left side portion 1b of the belt 1 suddenly contracts itself due to its thickness increased by release from the stretching force applied to the right side portion 1a. Therefore, the embodiment of FIG. 2 carries out the shrinking treatment of the work material 8 substantially as effectively as that of FIG. 1.

Further, the embodiment of FIG. 2 deserves notice in that there are provided a pair of heating and calendering rollers 13 and 14 ahead and behind the upper roller 6, respectively. Provision of these two heating and calendering rollers 13 and 14 enables the work material to be heated more effectively. Further where said rollers 13 and 14 are made to rotate independently of the shrinking machine by an external source of driving power at a different peripheral speed from that at which the endless rubber belt 1 is made to travel, then calendering can be applied to the surface of the work material 8. Since calendering is desired to take place prior to the shrinking treatment of the work material 8, it is preferred that the heating and calendering roller 13 positioned ahead of the driving roller 2 be designed to undertake said calendering and, if necessary, the heating and calendering roller 14 disposed behind the driving roller 2 be allowed to carry out final calendering. For simplification of the drawing, the water spray 10 is omitted from FIG. 2.

There will now be described by reference to FIG. 3 a shrinking machine according to still another embodiment of this invention. The same parts of FIG. 3 as those of FIG. 2 are denoted by the same numerals or notations as FIG. 1 or those related thereto.

The endless rubber belt 1 is movably supported by two support rollers 3a and 3b, a tension control roller 5 and two driving rollers 2a and 2b. The two driving rollers 2a and 2b are jointly connected to a common source of driving power by driving shafts 4a and 4b, respectively, and made to rotate in the same direction of the arrows A. The upper roller 6 faces one driving roller 2a across the endless rubber belt 1 to press said belt 1 against the periphery of said one driving roller 2a at the tangential point D. Said upper roller 6 is allowed to move upward in the direction of the solid line arrow $E_1$ or downward in the direction of the broken line arrow $E_2$ so as to adjust the pressure with which the endless rubber belt 1 abuts against said one driving roller 2a, and concurrently acts as a heating roller. Throughout the following description, the upper roller 6 is referred to as a heating roller.

The lower roller 7 faces the other driving roller 2b across the endless rubber belt 1 to press said belt 1 against the periphery of said other driving roller 2b at the tangential point G. Said lower roller 7 is allowed to move upward in the direction of the solid line arrow $H_1$ or downward in the direction of the broken line arrow $H_2$ so as to adjust the pressure with which the endless rubber belt 1 abuts against the periphery of said other driving roller 2b. The pressures applied at the two tangential points D and G should be equal but are allowed to have such a relatively low level that where the tension control roller 5 is shifted in the direction of the solid line arrow $C_1$ to stretch the right side portion 1a of the endless rubber belt 1, said belt 1, is prevented from slipping at the tangential points D and G. Where both driving rollers 2a and 2b rotate in the same direction of the arrows A, the heating roller 6 and lower roller 7 rotate in the directions of the arrows F and I, respectively, causing the endless rubber belt 1 to travel in the direction of the arrow B. During the travel of said belt 1, the difference between the thicknesses of the right side portion 1a and left side portion 1b of said belt 1 is kept unchanged.

Figure 3:
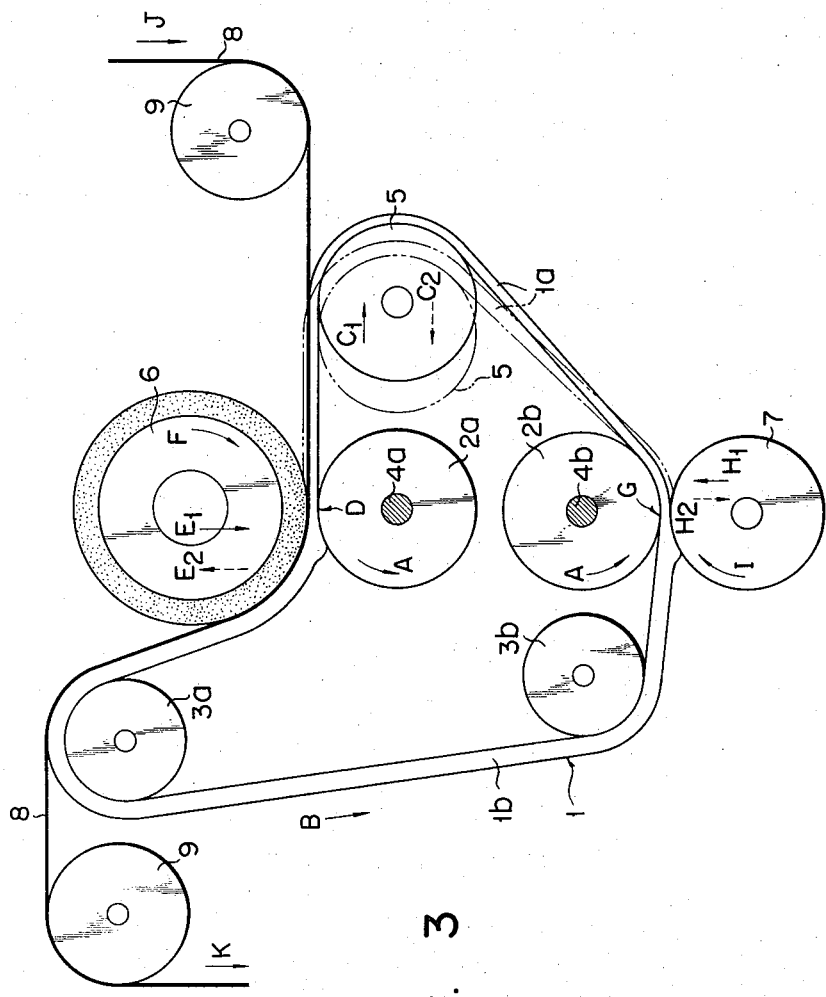
FIG. 3 is a schematic side view of a shrinking machine according to still another embodiment of the invention.

A work material such as cloth or paper is brought to the shrinking machine from the right side of FIG. 3 in the direction of the arrow J, guided around the forward guide roller 9, and carried first together with the right side portion 1a of the endless rubber belt 1 up to the tangential point D and thereafter together with the left side portion 1b. Immediately after passing said tangential point D, the endless rubber belt 1 has its left side portion 1b suddenly contracted due to its thickness being increased by release from the stretching force applied to its right side portion 1a, thereby causing the work material 8 closely attached to said belt 1 to shrink to the same extent as the contraction of the left side portion 1b. The work material 8 whose shrinking treatment has been completed travels together with the left side portion 1b while tightly pressed against the periphery of the heating roller 6. While passing the periphery of said heating roller 6, the work material 8 has its shrunk form permanently set. Thereafter work material 8 is separated from the left side portion 1b of the endless rubber belt 1 and guided around the rear guide roller 9 in the direction of the arrow K to be delivered outside of the shrinking machine. For simplification of the drawing, the water spray 10 is omitted from FIG. 3. It deserves notice that the embodiment of FIG. 3 uses two driving rollers 2a and 2b. The embodiment of FIG. 3 in which both rollers 2a and 2b are rotated under the same condition does not present any substantial difference with respect to the driving of the endless rubber belt 1 from the embodiments of FIGS. 1 and 2. However, the embodiment of FIG. 3 which includes two driving rollers 2a and 2b each having a relatively small diameter offers advantage where problems are expected to arise with the material or mechanical strength of a single large diameter driving roller 2 in designing a shrinking machine. In the case of FIG. 3, the arrangement of both driving rollers 2a and 2b at a considerable space is not desirable, because the endless rubber belt 1 would have to be more lengthened by that extent, such a long belt would give rise to increased shaking during its travel, and effective prevention of said shaking would require a number of minor small diameter guide rollers to be additionally provided between the main guide rollers.

For avoidance of the shaking of the endless rubber belt during its travel, the embodiment of FIG. 1 has an optimum arrangement. The reason is that the right side portion 1a and the left side portion are of the endless rubber belt 1 tightly pressed against the periphery of the driving roller 2 and the supporting roller 3, both of which have a relatively large diameter, and that the driving roller 2 and the support roller are arranged at a relatively small interval. However, all the aforesaid three embodiments can shrink a work material with the same effect, namely, far more efficiently than the prior art, thereby rendering the structure of the work material more compact and mechanically stronger.

As mentioned above, the shrinking method of this invention consists in stretching one portion of an endless rubber belt to reduce its thickness and causing the other nonstretched portion to contract itself at a boundary point between both portions due to its thickness being increased by release from the stretching force applied to said one portion. The upper and lower rollers have only to press the endless rubber belt against the driving roller with such a relatively low pressure as is required to prevent said belt from slipping off the surface of the driving roller. Therefore, the shrinking machine of this invention is characterized in that it can shrink paper or knitted goods which have hitherto failed to be shrunk by the prior art shrinking machine using considerably high pressure. Where a work material consisting of, for example, newspaper, is subjected to shrinking treatment by the shrinking machine of this invention, then the paper will not only be rendered tougher, but also be less subject to the blotting of printed ink and saved from the so-called back impression caused by the printing ink spreading to the backside of paper, thereby reducing ink requirement and attaining distinct impression. Further, where a work material consisting of knitted goods is subjected to shrinking treatment by the shrinking machine of the invention, then the relatively low pressure used for said treatment will enable the texture of the knitted goods to be prevented from being crushed with resultant increased toughness and also saved from the decreased visual appeal or rather more elevated in said visual appeal.

Low pressure used in the shrinking treatment by the apparatus of this invention also has the advantage of prominently increasing the travelling speed of the endless rubber belt, or the rate of shrinking a work material, thereby providing an inexpensive shrunk product and further elevating the durability of the parts of said apparatus because they are not impressed with any excess pressure.

Though not described in connection with the foregoing embodiments, it sometimes happens that while travelling, the endless rubber belt has its surface slightly melted by the heat of the heating roller and the melted portion is likely to attach itself to the surface of the work material carried with said belt. It is therefore advisable to cover one or both sides of the work material with another piece of cloth or paper to avoid such attachment. Even this does not substantially affect the shrinking efficiency of the apparatus of this invention. Further, where woven fabric which is not desired to present a glossy surface is subjected to the shrinking treatment, the above-mentioned procedure prevents the appearance of said gloss.

It is possible to provide narrow linear slip-stopping projections on those parts of the peripheral surface of, for example, a driving roller which are brough into contact with the surface of the endless rubber belt.

Obviously, this invention is not limited to the foregoing embodiments, but may be applicable in any other modifications unless they depart from the object of the invention.

What is claimed is:

1. A method of shrinking a work material such as cloth or paper which comprises the step of:
    a. providing an elastic endless rubber belt continuously driven only one way by driving means, said rubber belt having its thickness reduced when stretched;
    b. providing upper and lower driven rollers such that they face each other across the driving means and endless rubber belt;
    c. clamping the endless rubber belt by simultaneously shifting the upper and lower driven rollers toward two opposite clamping points on the periphery of the driving means with a relatively low and substantially equal pressure applied to the intervening endless rubber belt by cooperation of each of the upper and lower driven rollers with the driving means;
    d. shifting and stretching one portion of the endless rubber belt defined between the two clamping points so as to let it have a smaller thickness than the other nonstretched portion of said belt before the rubber belt is driven;
    e. continuously driving the rubber belt;
    f. placing a work material on said one stretched and thinned portion of the endless rubber belt and conducting the work material to one clamping point together with said one stretched and thinned portion;
    g. causing the other nonstretched portion of the endless rubber belt suddenly to contract itself immediately after said belt passes said one clamping point due to its thickness being increased by release from the stretching force applied to said one portion of said belt, thereby enabling the work material tightly attached to the surface of said other nonstretched portion to shrink to the same extent as the contraction of said other nonstretched portion; and
    h. heating the work material thus treated so as to permanently set its shrunk form.

2. A shrinking method according to claim 1, wherein said driving means comprises a driving roller, and said one stretched and thinned portion of the endless rubber belt is tightly pressed against the periphery of the driving roller.

3. A shrinking method according to claim 1, wherein the extent to which said one portion of the endless rubber belt is stretched and thinned is adjusted by shifting a tension roller for guiding said belt by contact therewith at a given point, thereby causing the work material to be shrunk in varying degrees.

* * * * *